United States Patent [19]

Cummings

[11] Patent Number: 5,459,479
[45] Date of Patent: Oct. 17, 1995

[54] SOLID STATE DEPTH LOCATOR HAVING LIQUID CRYSTAL DISPLAY

[75] Inventor: Duane E. Cummings, Monticello, Minn.

[73] Assignee: Marcum Enterprises Incorporated, Monticello, Minn.

[21] Appl. No.: 138,236

[22] Filed: Oct. 15, 1993

[51] Int. Cl.$^6$ .............................. G09G 3/00; G01S 9/68
[52] U.S. Cl. .................. 345/50; 345/33; 345/89; 367/108
[58] Field of Search ..................... 367/108, 109, 367/110, 111; 345/140, 142, 149, 147, 89, 33, 34, 35, 38, 50–54

[56] References Cited

U.S. PATENT DOCUMENTS

| | | | |
|---|---|---|---|
| Re. 33,532 | 2/1991 | Ishii | 345/148 |
| 3,821,598 | 6/1974 | Holz | 315/169 R |
| 3,835,447 | 9/1974 | Lowrance | 340/3 R |
| 4,014,013 | 3/1977 | McElroy | 340/336 |
| 4,064,478 | 12/1977 | Honda | 340/3 C |
| 4,183,025 | 1/1980 | Kutaragi et al. | 345/140 |
| 4,242,679 | 12/1980 | Morozumi et al. | 345/52 |
| 4,427,978 | 1/1984 | Williams | 345/89 |
| 4,644,512 | 2/1987 | Grilk | 367/108 |
| 4,675,740 | 6/1987 | Bafaro et al. | 358/243 |
| 4,829,492 | 5/1989 | Choi et al. | 367/108 |
| 4,879,697 | 11/1989 | Lowrance et al. | 367/111 |
| 4,904,064 | 2/1990 | Lagerwall et al. | 350/350 S |
| 4,982,182 | 1/1991 | Flinois | 340/762 |
| 5,023,603 | 6/1991 | Wakimoto et al. | 345/148 |
| 5,041,823 | 8/1991 | Johnson et al. | 340/784 |
| 5,127,352 | 7/1992 | Kulpa | 114/114 E |
| 5,260,912 | 11/1993 | Latham | 367/111 |

OTHER PUBLICATIONS

Product Data Sheet for H0438A, Serial Input LCD Driver, Dec. 1988, Hughes Microelectronics Center.
Product Data Sheet for LM1812 Ultrasonic Transceiver, National Semiconductor.

*Primary Examiner*—Richard Hjerpe
*Assistant Examiner*—Steven J. Saras
*Attorney, Agent, or Firm*—Westman, Champlin & Kelly

[57] ABSTRACT

A solid state depth locator comprises an LCD display having a plurality of LCD segments for providing a real time output indicative of the depth of targets in a body of water. A drive circuit drives each segment of the plurality of LCD segments. A transducer, transmitter and receiver operate together to provide a real time data signal to the drive circuit for driving each segment of the plurality of LCD segments, the real time data signal having a time period and being representative of the presence of targets in the body of water. A clock provides a clock signal to the drive circuit for clocking the real time data signal serially into the LCD drivers. The clock signal has a plurality of clock pulses within the time period of the real time data signal corresponding to the number of LCD segments. A grey scale circuit is provided for varying the intensity of each segment of the LCD display in relation to the strength of the real time data signal.

14 Claims, 5 Drawing Sheets

SOLID STATE DEPTH LOCATOR HAVING LIQUID CRYSTAL DISPLAY

BACKGROUND OF THE INVENTION

The present invention relates generally to a solid state depth locator or "fish finder" having a liquid crystal display (LCD), and more particularly, to a depth locator wherein the LCD is driven in real time and wherein the darkness of individual LCD segments may be varied.

Depth locators or fish finders have been used in the fishing industry for providing a user with a generalized "picture" of what is in the water under a boat or other vessel, based on the return signals produced in response to sonar transmissions into the water. Non-solid state depth locators having motors, rotating neon bulbs and other moving parts are less reliable, noisy and high in power consumption. Solid state depth locators having LED indicators are also high in power consumption. Liquid crystal displays have been used in connection with depth locators in the fishing industry to overcome these problems.

In the past, depth locators systems having LCD's use multiplexers to drive the individual segments of the LCD at a rate fast enough to be flicker free. The advantage of driving the LCD segments with multiplexers is a reduction in the number of chips necessary to drive the LCD which reduces the cost of the system. However, the disadvantages of a multiplexer driven LCD include a narrow viewing angle such that the user must be generally right over the display in order for it to be seen clearly. Also, LCD's driven by multiplexers require the use of microprocessors having inherent processing times which cause an event lag and prevent the display from being in real time.

In addition, depth locator systems utilizing LCD's typically implemented only two LCD states: an "on" state when an LCD segment was polarized indicating the presence of a target, and an "off" state when the LCD segment was not polarized indicating the absence of a target. Some of these systems produce grey areas which are the result of a checkerboard arrangement in which some segments are "always on" and in which some segments are "always off".

Thus, in addition to providing a system which eliminates the viewing angle, event lag, and the direct sun-light bleeding out or fading problems, it would be desirable to provide a system capable of grey scaling individual LCD segments for indicating the relative strength of a target.

SUMMARY OF THE INVENTION

The present invention relates to a solid state depth locator comprising an LCD display having a plurality of LCD segments for providing a real time output indicative of the depth of targets in a body of water, drive circuit for driving each segment of the plurality of LCD segments, data signal generator for providing a real time data signal to the drive circuit for driving each segment of the plurality of LCD segments, the real time data signal having a time period and being representative of the presence of targets in the body of water, and a clock for providing a clock signal to the drive circuit for clocking the real time data signal serially to the LCD drivers, the clock signal having a plurality of clock pulses within the time period of the real time data signal corresponding to the number of LCD segments.

The data signal generator includes an electromechanical transducer for transmitting sound waves into the body of water, for receiving corresponding echoes from targets in the path of the sound waves, and for providing a first electrical signal in accordance with received echoes. An electrical transmitter connected to the transducer controls transmission of the sound waves by the transducer, and an electrical receiver connected to the transducer accesses and provides the first electrical signal produced by the transducer and provides the real time data signal.

In one embodiment, the present invention includes grey scale for varying the polarization of each segment of the LCD display in relation to the strength of the real time data signal. The grey scale circuit includes a dithering circuit for varying the activation frequency of each LCD segment over time such that a high activation frequency indicates a stronger target and a lower activation frequency indicates a weaker target, wherein the activation frequency corresponds to the number of times a particular LCD segment is activated per second.

DETAILED DESCRIPTION OF THE PREFERRED EMBODIMENTS

Figure 1:
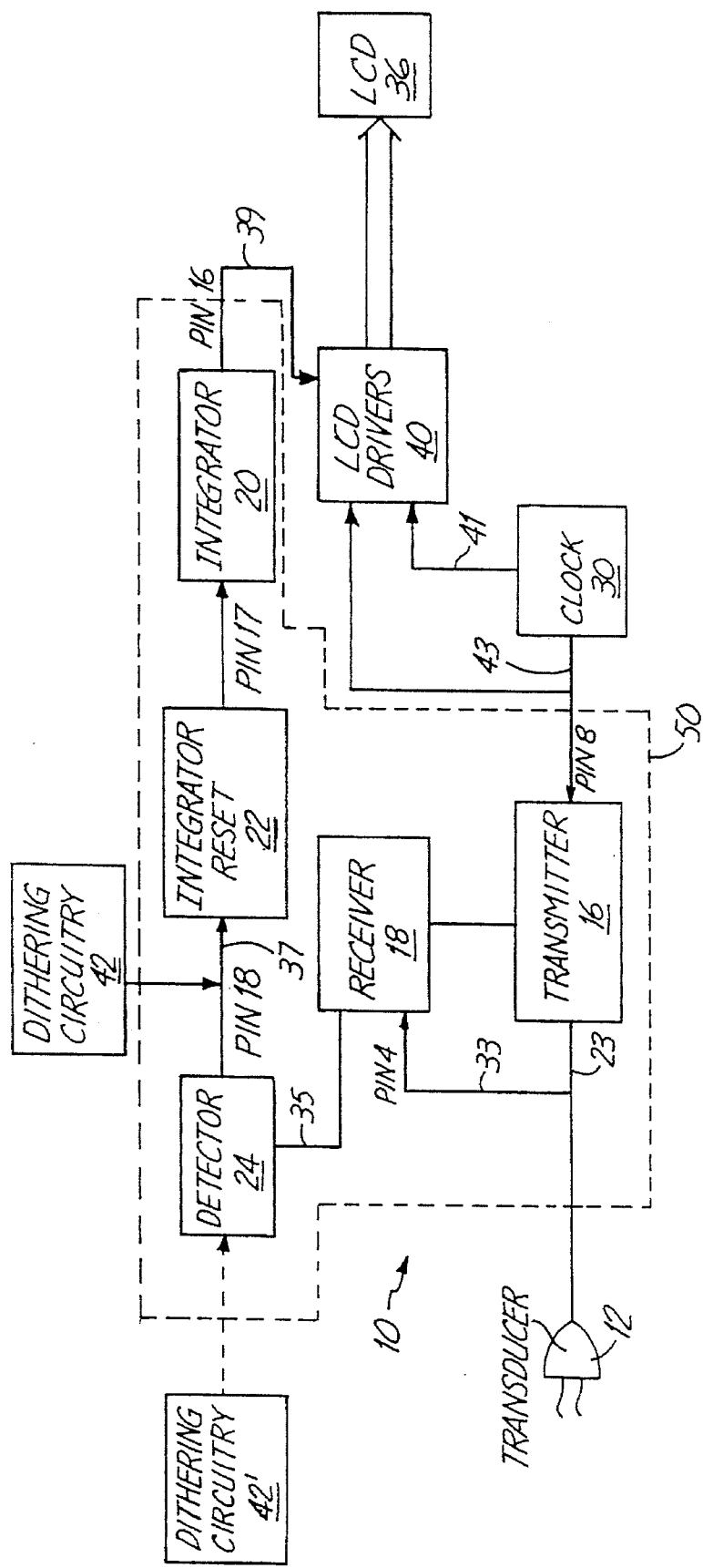
FIG. 1 is a block diagram of a solid state depth locator according to the present invention.

Referring to FIG. 1, a highly simplified block diagram illustrates the basic units or components of a solid state depth locator or fish finder 10 in accordance with the present invention. The depth locator 10 includes a transducer 12, a transmitter 16, a receiver 18, an integrator 20, an integrator reset 22, a detector 24, a clock 30, a liquid crystal display (LCD) 36 having 192 LCD segments, a plurality of LCD drivers 40 for driving the individual segments of the LCD 36, and a dithering circuitry 42 for providing a grey scale effect to the individual LCD segments.

The transmitter 16 transmits a pulse of energy, along a signal line 23, into the transducer 12 which is acoustically coupled to the water. The transducer 12 converts the electrical energy of the pulse into mechanical energy causing a sound wave to be generated. The sound reflects off any objects in its path, such as fish, rock and the bottom. The reflected sound or echo is received by the transducer 12 which converts the reflected sound into a corresponding electrical return signal. The return signal is fed into the receiver 18, along a signal line 33, where it is shaped, amplified and otherwise processed. The return signal is then received by the detector 24, along a signal line 35, which provides a digitized data signal based on the voltage of the return signal compared to a detector threshold voltage to the integrator reset 22, along a signal line 37. The integrator reset 22 produces a delay for controlling the reset of the integrator 20 which alters the width of the digitized output data signal. The data signal is then provided to the LCD drivers 40 along a signal line 39. The clock 30 provides a clock signal to the LCD drivers 40 along a signal line 41 for clocking the data signal into the LCD drivers 40. The clock 30 provides a transmit/load signal along a signal line 43 to the transmitter 16 for initiating a new pulse of energy to the transducer 12, and to the LCD drivers 40 for loading the previous data signal to the 192 individual LCD segments, thereby providing a real time display of targets under the surface of the water. It is to be understood that similar timing devices, such as a microprocessor, could be used to provide timing signals in place of the clock 30. Driving the LCD segments directly, as opposed to using multiplexers and microprocessors to drive the LCD segments, yields a more intense image which is observable over a greater viewing angle and also in direct sunlight.

The dithering circuity 42 alters the output data signal, such that over time each LCD segments is provided with an activation frequency reflecting the strength of the return signal. In other words, the dithered data signal will vary the number of times per second a particular LCD segments is activated (activation frequency) wherein the stronger the return signal the more times per second a particular LCD segment is activated and the weaker the signal the fewer number of times per second a particular LCD segment is activated. The grey scale effect is caused by dithering the integration reset 22 or by dithering the detector 24 threshold activation level as illustrated as $42^1$. Dithering the integrator reset 42 in essence increases or decreases the width of the data signal pulses by resetting the integrator 20 either too soon or too late, so that, over time, some pulses are detected by the detector and others are not. This procedure alters the number of LCD segments activated. Dithering the detector threshold as illustrated by dithering circuit $42^1$ changes the amplitude of the data signal pulses required for detection, so that, over time, some pulses are detected by the detector 24 and others are not thereby altering the activation frequency of individual LCD segments. It is to be understood that dithering the amplitude or width of the data signal pulses themselves also produces a grey scale effect and such methods are intended to be covered within the scope of the present invention.

Figure 2:
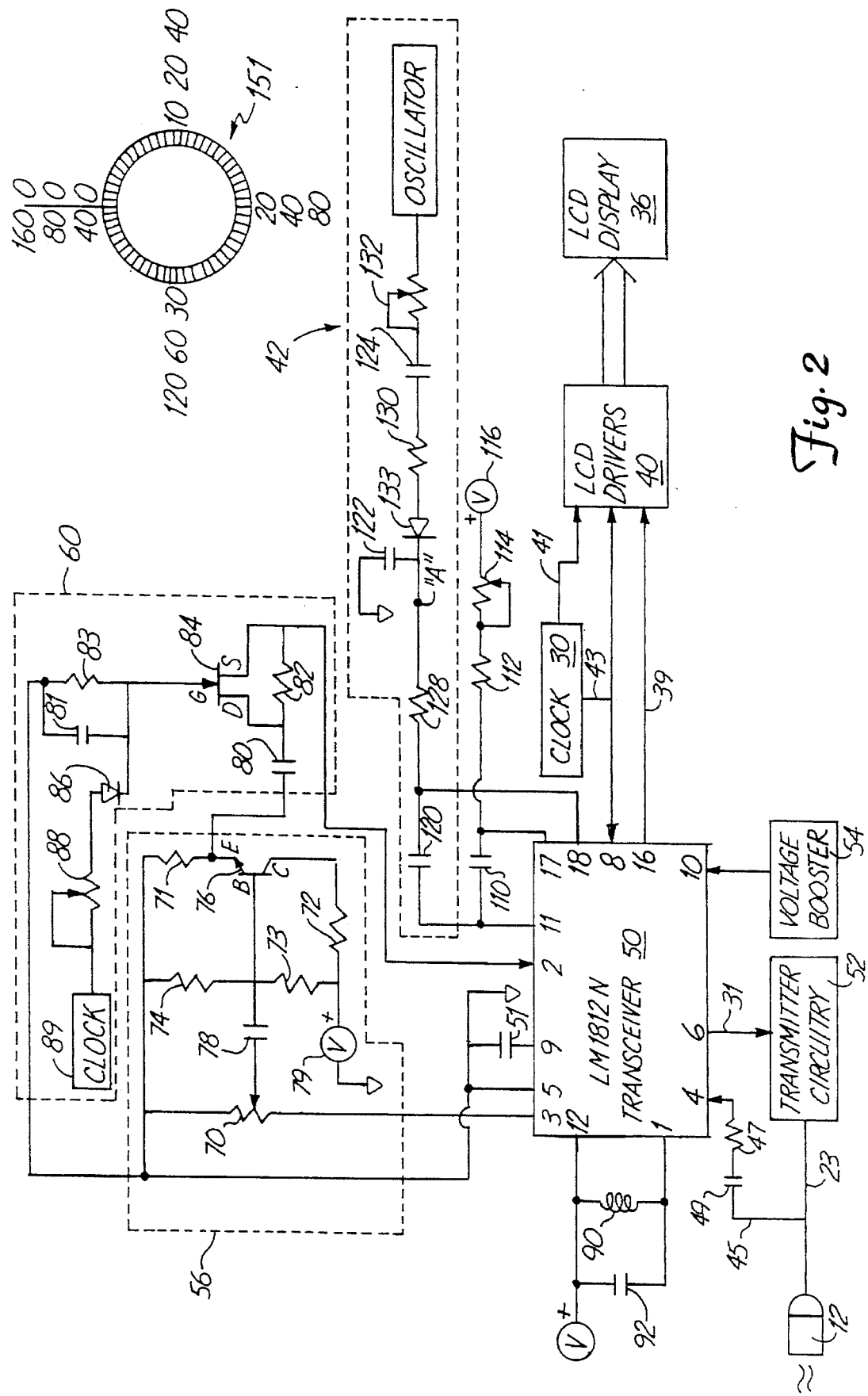
FIG. 2 is a more detailed diagram of a first embodiment of the present invention.

Referring to FIG. 2, an illustrated embodiment of the depth locator 10 utilizes an LM1812N transceiver 50 which has internal circuitry for performing the functions of the integrator reset 22, the integrator 20, the detector 24 and part of the functions of the transmitter 16 and receiver 18. The pin connections of the LM1812N are indicated on both FIGS. 1 and 2. In addition to the LM1812N, the depth locator 10 includes external transmitter circuitry 52, a voltage booster 54, a gain stage 56, and a time variable gain stage 60.

Figure 3A:
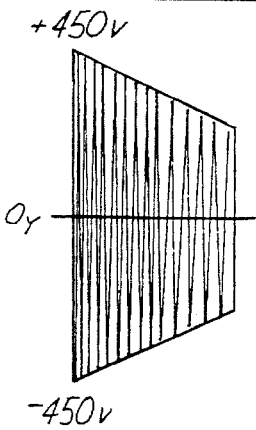
FIGS. 3A–3H are graphs illustrating wave forms of electrical signals at various points on the diagrams shown in FIGS. 1 and 2.
Figure 3B:
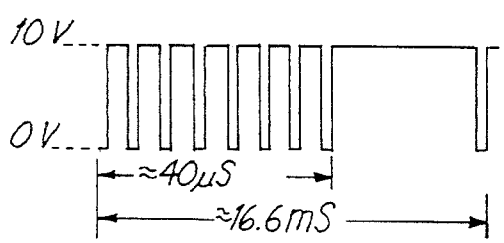
Figure 3C:
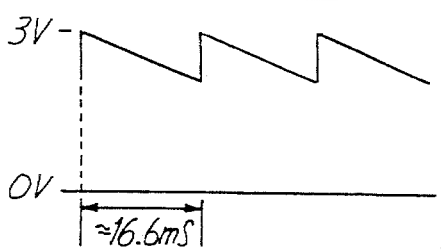

The LM1812N transceiver 50 receives a transmit signal (see FIG. 3G) at pin 8 along line 43 from the clock 30 and then transmits an AC electrical drive pulse (see FIG. 3B) from pin 6 along line 31 to transmitter circuitry 52. The transmitter drive pulse is approximately 16.6 ms long having an initial 40 μs pulse train. The 40 μs pulse train drives an oscillator (not shown) in the transmitter circuitry 52 for producing a high voltage transmit pulse (see FIG. 3A). The transmit pulse is provided to the transducer 12 along signal line 23. The transmitter circuitry 52 is a well known combination of transformers, amplifiers and other electrical components for producing the high voltage transmit pulse in accordance with the transmit drive pulse. The frequency of the transmit pulse is 199 kHz and the peak to peak voltage of the transmit pulse is approximately 900 V. The voltage of the transmit pulse drops off with time primarily as a result of discharge of a capacitor (not shown) used to maintain the voltage supply. The pulse width is shown in FIG. 3A as being 75 μs; however, the pulse width varies depending upon the particular depth scale being used and the desired target resolution which is the minimum distance between two targets that can be detected such that the smaller the desired resolution, the smaller the width of the transmit pulse. A transmit pulse of approximately 75 μs translates into a target resolution of approximately 2.5 inches, using 192 LCD segments on a forty foot scale. On an 80 foot scale, a transmit pulse of approximately 150 μs translates into a target resolution of approximately 5 inches, and on a 160 foot scale a transmit pulse of approximately 300 μs translates into a target resolution of approximately 7.5 inches. The transmit drive pulse is configured to achieve the desired transmit pulse.

The transducer 12 converts the electrical transmit pulse from the transmitter circuitry 52 into sound waves and transmits the sound waves into the body of water so that the sound waves are reflected by obstructions (targets) in the water, if any, and in any event by the bottom, back to the transducer 12 for conversion into an electrical return signal which is fed along line 45 through a resister 47 and a capacitor 49 into pin 4 of the LM1812N transceiver 50. Internal amplifiers (not shown) within the LM1812N amplify the return signal.

The external gain stage 56 further amplifies the return signal to a level which is detectable and manageable for processing purposes. The external gain stage 56 includes a potentiometer 70, resistors 71, 72, 73, and 74, an NPN transistor 76, a capacitor 78 and a voltage source 79. The potentiometer 70 is connected between pin 3 of the LM1812N transceiver 50 and ground and the potentiometer wiper arm is connected through the capacitor 78 to the base of the transistor 76 for adjusting the gain. The emitter of the transistor 76 is connected to the potentiometer 70 and to ground through the resistor 71 and to the base of the transistor 76 through the resistors 71 and 74. The collector of the transistor 76 is connected to the base of the transistor 76 through resistors 72 and 73 and to the voltage source through resistor 72.

The time variable gain (TVG) stage 60 amplifies the amplified return signal with a time variable gain which compensates the amplified return signal for strength losses which occur as water depth increases, and as a result of water elasticity, spherical spreading, etc. In other words, the TVG stage 60 amplifies the weaker portion of the return signal corresponding to deeper water according to a 20log(R) curve which represents the attenuation of sound in water where R is the distance the sound has traveled in the water. The TVG stage 60 includes capacitors 80 and 81, resistors 82 and 83, a FET transistor 84, a diode 86, a potentiometer 88, and a clock 89. The amplified return signal is provided from the emitter of the transistor 76 (gain stage) to the drain of the transistor 84 through the capacitor 80. The resistor 82 is connected across the drain and source of the transistor 84, and a TVG control signal, created by the clock 89, is connected to the gate of the transistor 84 through the potentiometer 88 in series with the diode 86. The gate of the transistor 84 is also connected to ground through the resistor 83 in parallel with the capacitor 81. The TVG control signal at the gate of the transistor 84 (see FIG. 3C) has a time period equal to the period of the data signal and a voltage of approximately 3 volts which decreases linearly to approximately 2.5 volts. The transistor 84 represents a variable resistance in parallel with the resistor 82 for amplifying the portion of the data signal corresponding to the deeper water, which is in essence the first half of the signal.

Figure 3D:
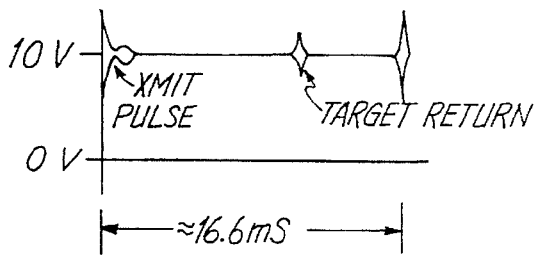

The TVG adjusted return signal is provided from the source of the transistor 84 back to LM1812N transceiver 50 at pin 2. A frequency adjustment is then made on the return signal within the LM1812N transceiver 50 between pins 1 and 12 using an inductor 90 in parallel with a capacitor 92. This LC circuit 90 and 92 is also used to tune the transmitter drive pulse to the same frequency. Referring to FIG. 3D the return data signal at pin 1 of the LM1812N transceiver 50 has now been processed such that the transmit pulse 100, target return 102, and bottom 104 are detectable. Pins 10, 11 and 15 of the LM1812N transceiver 50 are tied to an analog ground and also to the voltage booster 54 for increasing the transmit voltage. Pin 9 is tied to ground through a capacitor 51 to provide a receiver turn-on delay after the transmit drive pulse is sent.

Figure 3E:
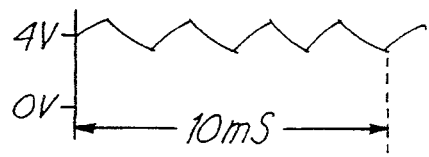

Referring to FIGS. 1 and 2, the data signal is fed to the detector 24 and then to the integrator 20. The integrator of the LM1812N is designed for filtering out noise interference in the data signal; however, in the present application the integrator 20 is used to vary the width of the data signal pulses to cause a grey scale effect. The integrator 20 includes a capacitor 110, a resistor 112, a potentiometer 114 and a voltage source 116 (all external to the LM1812N transceiver 50). In order to cause the grey scale effect, a small AC dither signal (see FIG. 3E which illustrates the dither signal at point "A" in FIG. 2) is combined with the data signal at the integrator reset 22 causing the time constant of the RC combination 110, 112, 114 of the integrator 20 to vary with time. In other words the dither signal either delays or accelerates the charging of capacitor 110 which in essence lengthens or shortens the width of the data signal pulses over time. The detector 24 of the LM1812N transceiver 50 switches on all pin 1 signals that exceed an LCD activation threshold of 1.4 volts peak to peak. By varying the width of the data signal pulses, the detector 24 detects either a longer signal which increases the number of LCD segments activated or a shorter signal which decreases the number of LCD segments activated, thereby varying the activation frequency of individual LCD segments over time. When the voltage at pin 1 becomes too small to activate the detector 24 the integrator 20 is reset (meaning that the capacitor 110 is discharged) by the integrator reset 22.

The dithering circuitry 42 further processes the return signal by adding noise to the return signal which causes the return signal to fluctuate about the LCD threshold level for activation of an LCD segment. The dithering circuity 42 includes capacitors 120, 122, 124 resistors 128, 130, potentiometer 132, a diode 133, and oscillator 134. The capacitor 120 is placed across pins 18 and 11 of the LM1812N transceiver 50. Pin 18 is also connected to ground through resistor 128 are parallel with capacitor 122. The diode 133 is connected to the capacitor 122 and resistor 128 and in series with resistor 130, which is connected in series to capacitor 124, which is connected in series to potentiometer 132, which is connected in series to oscillator 134. The oscillator 134 produces a small square wave signal which provides a triangular wave (see FIG. 3E) at point "A" in FIG. 2 and fed into pin 18 of the LM1812N transceiver 50 where it is combined with the data signal for randomly charging and discharging the capacitor 110 of the integrator 20. Thus, by varying the time delay on resetting the integrator 20, the width of the data signal pulses is shortened or lengthened in accordance with the strength of the signal. Varying the width of the pulses causes the detector 24 to produce either a longer or shorter "on" signal, since the activation threshold of the detector 24 is activated over a longer or shorten time period, respectively. If the data signal is lengthened, more LCD segments are activated while if the data signal is shortened, fewer LCD segments are activated. Thus, dithering the integrator reset 22 varies the activation frequency of individual LCD segments.

FIGS. 4A–4D illustrate the waveforms at pins 16, 17 and 18 of the LM1812 and transceiver 50 and also the output on the LCD 36 over a period of four transmit and load cycles. In FIGS. 4A–4D the data signal is shown having a first pulse indicative of the transmitter output, a second pulse indicative of the target, and a third pulse indicative of the bottom surface of the body of water. At pin 18, the data signal is mixed with the dither signal after the data signal has been in essence digitized by the detector 24. At pin 17, the dithered data signal varies the charging and discharging of capacitor 110 thereby changing the width of the data signal pulses. At pin 16, the output data signal has been converted to in essence a digital signal except the pulse width has been varied randomly by the dither circuitry 42. During the first time interval, the data signal remains essentially unchanged after passing through the detector 24 and is output pin 16 to the LDC drivers 40. The LCD drivers 40 clock the data signal to the LCD segments such that at the first time interval there are three LCD segments polarized for the transmitter pulse, two LCD segments polarized for the target pulse, and four LCD segments polarized for the bottom pulse. During the second time interval, the data signal is dithered such that the capacitor 110 charges slower then during the first time period, thereby shortening the width of the data signal pulses such that the LCD display polarizes two LCD segments for the transistor pulse, one LCD segment for the target, and three LCD segments for the bottom. During the third time interval, the data output signal is not dithered and the LCD output is the same as in time interval 1. During the fourth time interval, the data signal is again dithered after being digitized by the detector 24, except that the capacitor 110 has taken less time to charge thereby increasing the width of the pulses such that the LCD display polarizes the four LCD segments for the transistor pulse, three LCD segments for the target pulse and five LCD segments for the bottom. Over time, and at a rate which is flicker free, the LCD segment will appear grey along the weaker portions of the signal.

The grey scale effect may also be caused by dithering the LCD activation threshold of the detector 24 as illustrated by dithering circuit 42[1]. By increasing or decreasing the LCD activation threshold, the amplitude will at times be greater than the threshold so that the data pulse is detected and at other times be lower than the threshold so that the data pulse is not detected. Over time, and at a rate which is flicker-free, the variation in the activation frequency of the LCD's also creates a grey scale effect. Those skilled in the art will realize that there are other ways of creating grey scale by dithering. For example, the amplitude or time period of pulses in data signal itself may be dithered to alter the LCD activation frequency.

Figure 3F:
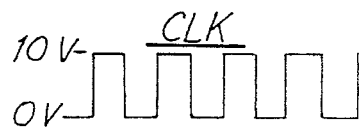
Figure 3G:
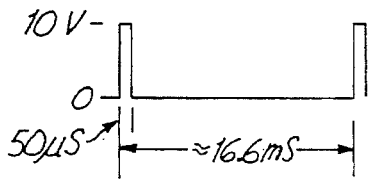
Figure 3H:
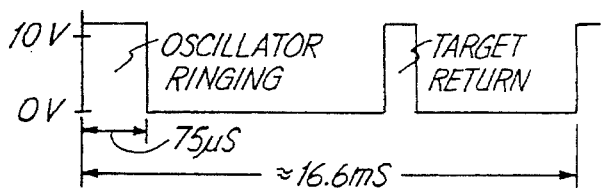
Figure 4A:
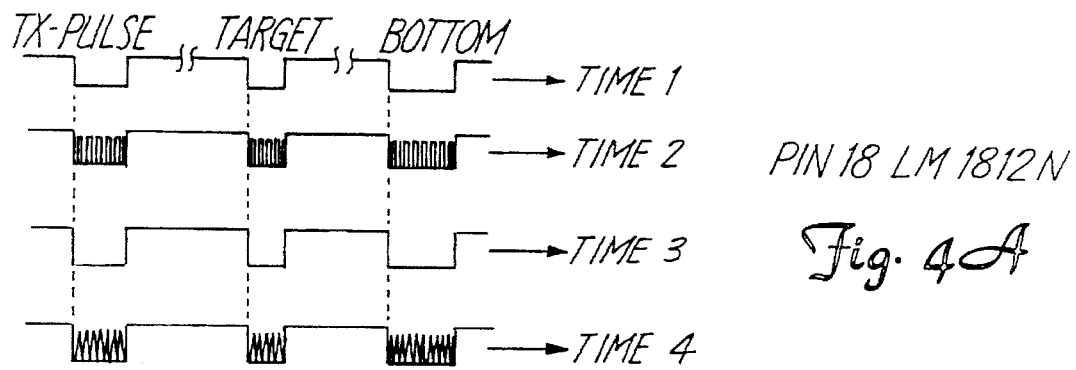
FIGS. 4A–4D are graphs illustrating the grey scale effect created by dithering the data signal before driving the LCD segments.
Figure 4B:
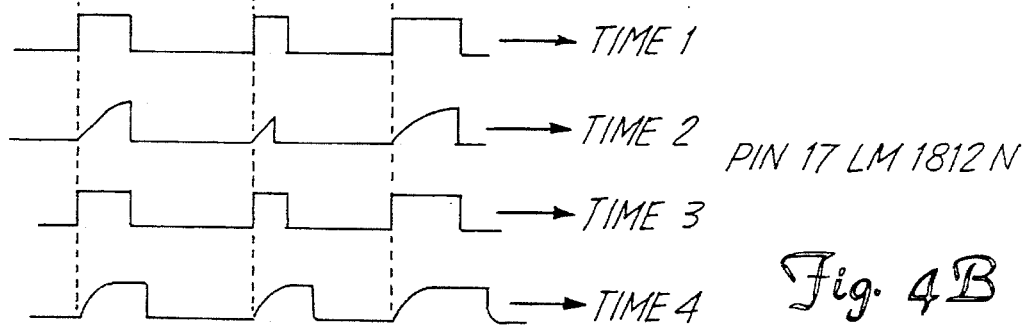
Figure 4C:
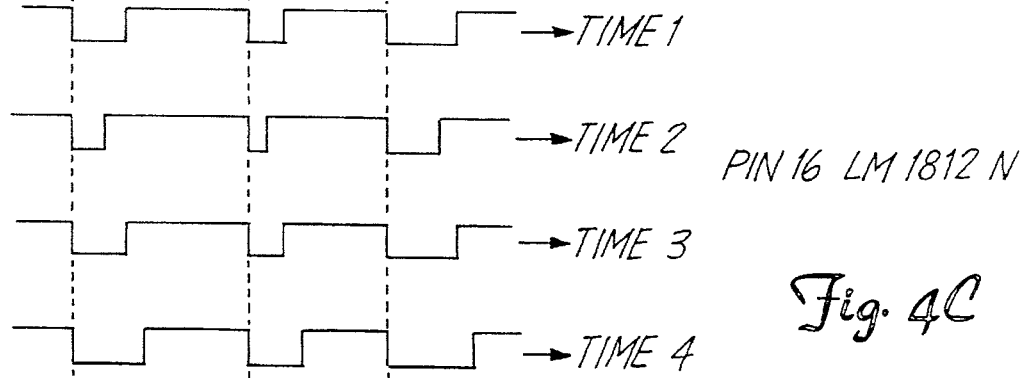
Figure 4D:
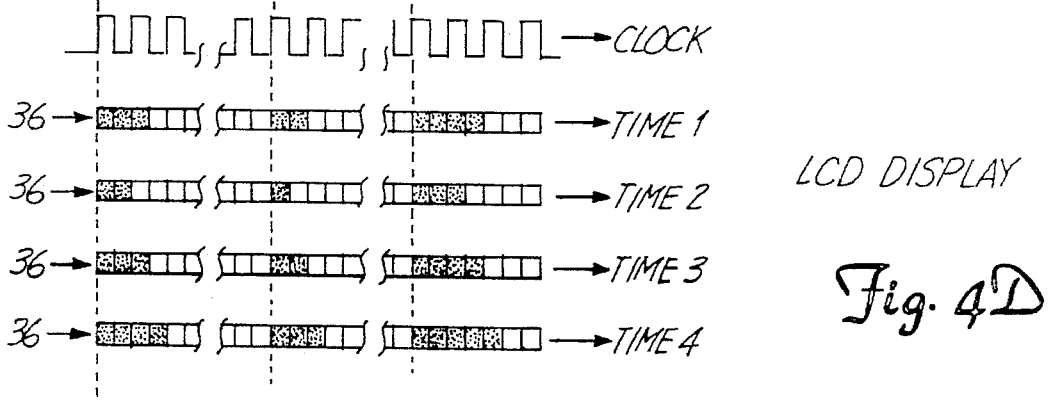
Figure 5:
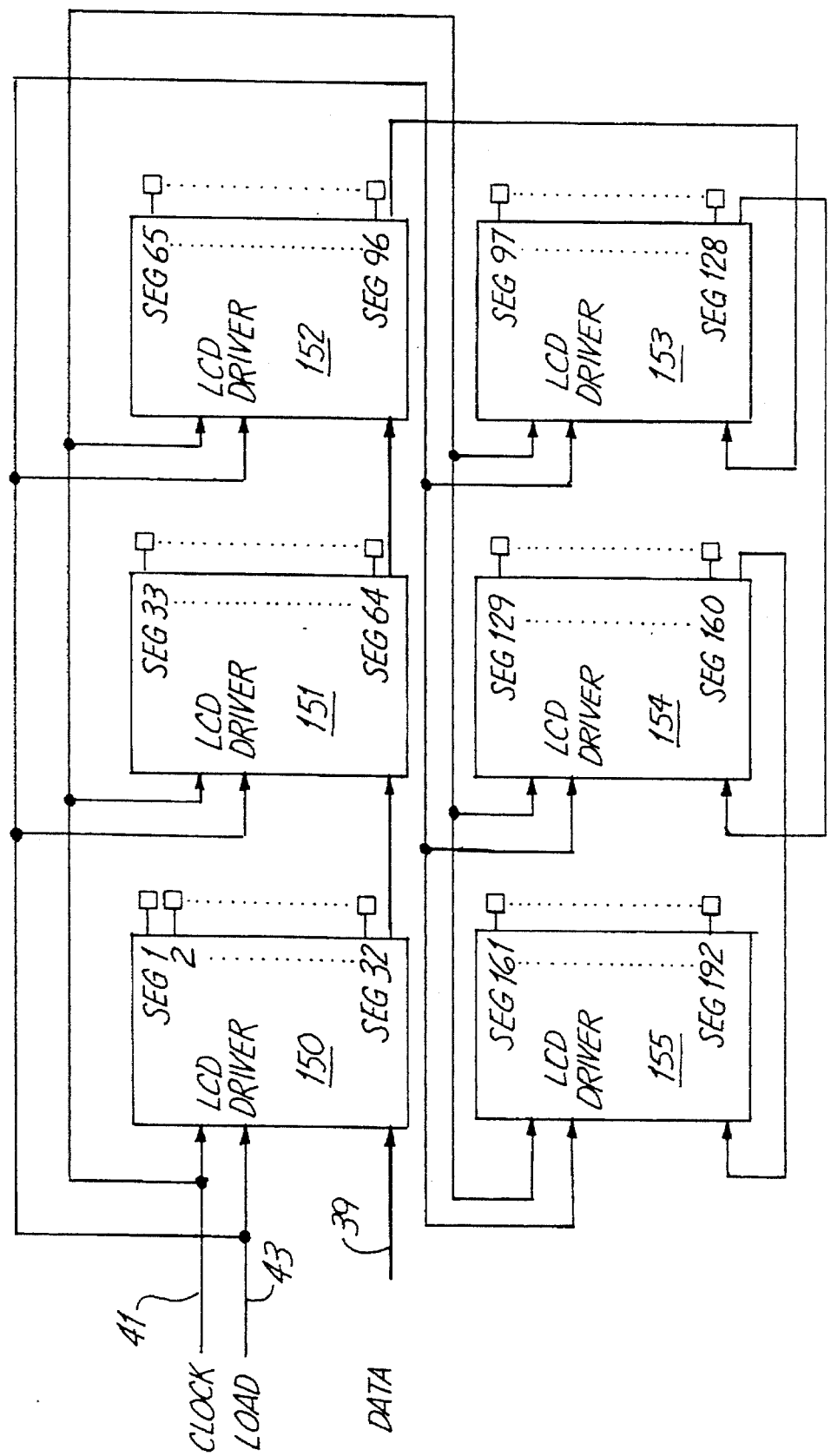
FIG. 5 is a schematic diagram of the LCD drivers.

Referring to FIG. 5, the output signal is transmitted from pin 16 of the LM1812N transceiver 50 and is then inverted and provided the LCD drivers 40 along signal line 39 with the clock signal along signal line 41 and the load signal along signal line 43. The LCD drivers 40 provides an AC signal to each LCD segment to polarize liquid between of each LCD segment. The LCD drivers 40 include six HC0438A LCD drivers 150, 151, 152, 153, 154, 155 manufactured by Hughes Aircraft Company, Newport Beach, Calif. The data inputs of the LCD drivers 40 are connected to form a static shift register, such that each one drives 32 of the 192 LCD segments. The data signal is provided to the driver 150 at pin 34 from the LM1812N, out pin 35 of driver 150 into pin 34 of driver 151, out pin 35 of driver 151 into pin 34 of driver 152, out pin 35 of driver 152 into pin 34 of driver 153, out pin 35 of driver 153 into pin 34 of driver 154, and out pin 35 of driver 154 into pin 34 of driver 155. The clock signal (see FIG. 3F) and the load signal (see FIG. 3F) are fed in parallel into LCD drivers 150–155 at pins 40 and 2, respectively.

The clock signal has a total number of pulses over the time period of the data signal corresponding to the number of LCD segments such that on each clock pulse 1/192 of the data signal is loaded into the shift register for driving one of the 192 LCD segments. The frequency of the clock signal depends on the particular depth scale being used. For example, on a 40 foot scale the 192 clock pulses over a time period of 16.6 ms corresponds to a frequency of 11.52 kHz, on an 80 foot scale the 192 clock pulses over a period of 33.2 ms corresponds to a frequency of 5.78 kHz, and on a 160 foot scale the 192 clock pulses over a time period of 66.4 ms corresponds to a frequency of 2.89 kHz. Thus, in LCD driver 150 the first 32 clock pulses serially load the first one-sixth of the data signal to LCD segments 1–32. In LCD driver 151 clock pulses 33–63 serially load the second one-sixth of the data signal to LCD segments 33–64. In LCD driver 152 clock pulses 65–96 serially load the third one-sixth of the data signal to LCD segments 65–96. In LCD driver 153 clock pulses 97–128 serially load the fourth one-sixth of the data signal to LCD segments 97–128. In LCD driver 154 clock pulses 129–160 serially load the fifth one-sixth of the data signal to LCD segments 129–160. In LCD driver 155 clock pulses 161–192 serially load the last one-sixth of the data signal to LCD segments 161–192.

The load signal resets a series of latches for each LCD driver 150–155 to load the new data signal to the LCD segments. The load signal is the same signal used to activate the LM1812N transceiver 50 at pin 8 for transmitting the transducer drive pulse. The load signal has a time period equal to the time period of the data signal and has a single 50 μs pulse which causes the LM1812N to send a new transmit drive pulse at the same time the LCD drivers load the LCD segments with the previous data signal received after the previous transmit drive pulse. After the initial 50 μs pulse of the load signal the LM1812N transceiver is in receive mode to receive and process the return echo and the previous data signal is clocked into the LCD segments. Thus, the LCD drivers 150–155 display in real time a "picture" of what is under the water with no event lag since there are no multiplexers and no microprocessor to drive them. Driving the LCD segments directly also provides a more intense image which is observable over a wider viewing angle and also in direct sunlight.

An internal oscillator (not shown) of the LCD driver 150 is coupled to ground by a capacitor to set the back plane frequency to approximately 30 Hz. The internal oscillators of the LCD drivers 150–155 are then linked together to synchronize the back plane frequencies with each other.

Referring to FIG. 2, the LCD 36 utilizes H4337 liquid crystal fluid and is manufactured by Standish Corporation, Lake Mills, Wisc. The H4337 liquid crystal fluid provides a slow enough response time so that the grey scale effect caused by the dithering circuity 42 is physically observable to the user. The 192 individual segments of the LCD 36 are arranged in a circular pattern with three separate depth scale indicator markings 151 associated with each LCD segment and a switch (not shown) for switching between the three scales. The first scale measures down to 40 feet with a resolution of 2.5 inches for each of the 192 LCD segments. The second scale measures down to 80 feet with a resolution of 5 inches and the third scale measures down to 160 feet with a resolution of 7.5 inches. It is to be understood that the number of scales and the depth measurements on each of the scales may be varied to suit particular needs. The duration of the transmit pulse and the time periods of the data signal, clock signal, and load signal will vary depending on which scale is being used.

Although the present invention has been described with reference to preferred embodiments, workers skilled in the art will recognize that changes may be made in form and detail without departing from the spirit and scope of the invention.

What is claimed is:

1. A solid state depth locator for mounting in a boat to provide a real time display of targets in a body of water, the solid state depth locator comprising:

an LCD display having a plurality of LCD segments for providing a real time output indicative of the depth of targets in a body of water;

drive means for simultaneously driving each segment of the plurality of LCD segments;

data signal means for providing a real time data signal to the drive means for driving each segment of the plurality of LCD segments the real time data signal having a time period and being representative of the presence of targets in the body of water, the data signal means comprising:

electromechanical transducer means for transmitting sound waves into the body of water, for receiving corresponding echoes from targets in the path of the sound waves, and for providing a first electrical signal in accordance with the received echoes;

electrical transmitter means connected to the transducer means for controlling transmission of the sound waves by the transducer means;

electrical receiver means connected to the transducer means for receiving and processing the first electrical signal produced by the transducer means and for providing a receiver output signal;

detector means for receiving and comparing the receiver output signal to an activation threshold and for producing a detector output signal; and integrator means for receiving and integrating the detector output signal to provide the real time data signal, wherein the real time data comprises a digital signal having pulses of variable width, wherein each pulse corresponds to a target in the body of water, and wherein the width of each pulse corresponds to the strength of the corresponding target, the drive means activating selected LCD segments in proportion to the strength of each target; and clock means for providing a clock signal to the drive means for clocking the real time data signal serially into the LCD drivers, the clock signal having a plurality of clock pulses within the time period of the real time data signal corresponding to the number of LCD segments.

2. The depth locator as in claim 1, further comprising load means for providing a load signal having a time period equal to the time period of the real time data signal, the load means being connected to the drive means for indicating a beginning and an end of the real time data signal.

3. The depth locator as in claim 1, and further comprising dithering means for providing a dithering signal for varying the pulse width for each target of a set of targets located in the body of water over time such that a longer average pulse width indicates a stronger target and a shorter average pulse width indicates a weaker target.

4. The depth locator as in claim 1, further comprising time variable gain means operable with the receiver means having a fixed gain curve for compensating the real time data signal for transmission losses which occur as water depth increases.

5. The depth locator as in claim 4, wherein the time variable gain means attenuates a portion of the real time data signal corresponding to shallower water.

6. The depth locator as in claim 5, wherein the time variable gain means includes a resistor, a transistor in parallel with the resistor, and a TVG control signal operable with the transistor, the control signal having a time period equal to the period of the real time data signal.

7. The depth locator as in claim 1 further comprising grey scale means for varying the intensity of each segment of the LCD display in relation to the strength of the real time data signal.

8. A solid state depth locator for reporting a depth of each target of a set of targets located in a body of water, the solid state depth locator comprising:

electromechanical transducer means for transmitting sound waves into the body of water, for receiving corresponding echoes from targets in the path of the sound waves, and for providing a return signal in accordance with the received echoes;

electrical transmitter means connected to the transducer means for controlling transmission of the sound waves by the transducer means;

electrical receiver means connected to the transducer means for receiving and amplifying the return signal produced by the transducer means;

detector means for comparing the amplified return signal to an activation threshold and for producing an output signal;

an LCD display having a plurality of LCD segments for providing an output indicative of the depth of targets in a body of water;

drive means for driving each segment of the plurality of LCD segments;

integrator means for receiving and integrating the output signal to provide a digital signal having pulses of variable width to the drive means, wherein each pulse corresponds to a target in the body of water, and wherein the width of each pulse corresponds to the strength of the corresponding target, the drive means activating selected LCD segments in proportion to the strength of each target;

dithering means for providing a dithering signal for varying the pulse width for each target over time such that a longer average pulse width indicates a stronger target and a shorter average pulse width indicates a weaker target.

9. The depth locator of claim 8, further comprising clock means for providing a clock signal to the drive means for serially clocking the data signal to the plurality of LCD segments such that the LCD displays targets in real time, the clock signal having a plurality of clock pulses within the a period of the real data signal corresponding to the number of LCD segments.

10. The depth locator as in claim 8 and further comprising time variable gain means operable with the electrical receiver means having a fixed gain curve for compensating the return signal for transmission losses which occur as water depth increases.

11. The depth locator as in claim 10, wherein the time variable gain means attenuates a portion of the return signal corresponding to shallower water.

12. The depth locator of claim 8 wherein the time variable gain means compensates the return signal proportional to a 20log(R) function, wherein R is a distance traveled by a return echo for a corresponding target.

13. The depth locator as in claim 8, wherein the dithering means dithers the activation threshold such that portions of the data signal which are close to the activation threshold cause particular LCD segments to flicker on and off over time and thereby produce a grey scale effect.

14. The depth locator as in claim 8, wherein the dithering means dithers the width of data signal pulses such that portions of the data signal which have a width close to a width necessary to activate particular LCD segments cause those particular segments to flicker on and off over time and thereby produce a grey scale effect.

* * * * *

UNITED STATES PATENT AND TRADEMARK OFFICE
CERTIFICATE OF CORRECTION

PATENT NO. : 5,459,479
DATED : October 17, 1995
INVENTOR(S) : Duane E. Cummings

It is certified that error appears in the above-indentified patent and that said Letters Patent is hereby corrected as shown below:

```
Column 8, line 23, after "segments" insert --,--.

Column 10, line 16, cancel "the".
```

Signed and Sealed this

Nineteenth Day of March, 1996

Attest:

BRUCE LEHMAN

*Attesting Officer*  *Commissioner of Patents and Trademarks*